UNITED STATES PATENT OFFICE.

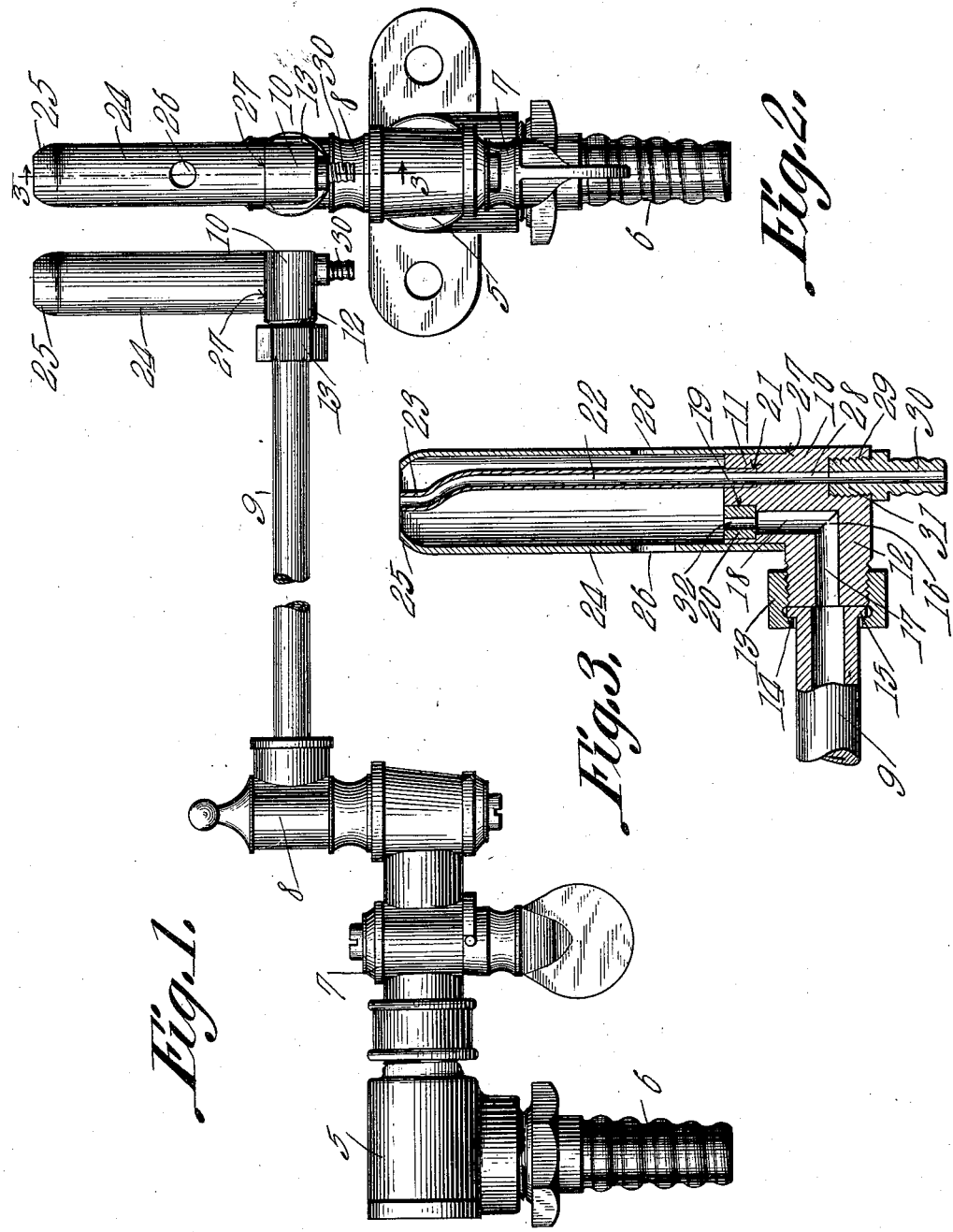

ARTHUR H. SCHILKE, OF WILMERDING, PENNSYLVANIA.

COMBINATION BURNER AND BLOWPIPE.

1,029,031.   Specification of Letters Patent.   Patented June 11, 1912.

Application filed February 5, 1912. Serial No. 675,499.

*To all whom it may concern:*

Be it known that I, ARTHUR H. SCHILKE, a citizen of the United States, residing at Wilmerding, in the county of Allegheny and State of Pennsylvania, have invented a new and useful Combination Burner and Blowpipe, of which the following is a specification.

This invention relates to combination burners and blow pipes, and has for its object to provide such a device which may be used either as a Bunsen burner or as a blow pipe, and which may be adjusted to apply the flame against the object to be heated at various angles.

A further object of the present invention is to provide such a device of novel and simple construction, and which shall be convenient and efficient in use.

To the above and other ends, this invention resides in the combination and construction of parts set forth in the following description and pointed out in the appended claims, reference being had to the accompanying drawings wherein the preferred embodiment of the invention is illustrated, and wherein:

Figure 1 is a side elevation of the combination burner and blow pipe. Fig. 2 is a front elevation thereof. Fig. 3 is a sectional detail taken on the line 3—3 of Fig. 2, being on an enlarged scale.

Referring in detail to the drawings, wherein similar reference characters indicate similar parts, the numeral 5 designates an elbow fixture or bracket which is adapted to be secured or attached to a wall or other support, and which has a hose nipple 6 connected to the depending arm thereof, and a valve 7 connected to the other arm thereof, which arm projects horizontally from the wall or support (not shown) to which the elbow is secured or attached. An upright coupling 8 is swiveled in the end of the valve 7 to rotate or swing about a vertical axis, and carries a tubular arm 9, which arm is arranged horizontally and is adapted to be swung in a horizontal plane. An L-shaped body 10 has one arm, designated by the numeral 12, abutting against the free end of the tubular arm 9, and a union 13 is screw-threaded upon the end of the arm 12 and is provided with an inturned lip 14 engaging over an outwardly projecting flange 15 provided at the extremity of the tubular arm 9, thereby swiveling the body 10 upon the free end of the said arm 9. The other arm of the body 10, designated by the numeral 11, is reduced in diameter to form a shoulder 27, and a mixing tube 24 has one end mounted on the reduced arm 11 and abutting against the shoulder 27, the free end of the mixing tube 24 being contracted as designated by the numeral 25. This mixing tube is also provided with diametrically opposed apertures or inlets 26 and the body 10 has an L-shaped duct 16 with its extremities extending to the extremities of the arms 11 and 12, the respective arms 18 and 17 of the said duct passing through the arms 11 and 12 of the body 10. The extremity of the said duct in the arm 11 is arranged adjacent the side of the said arm 11 and is counterbored to form a socket 19. A mouthpiece 20 fits in the socket 19 and has an aperture or orifice 32 extending therethrough. The body 10 also has an air duct 28 extending from the extremity of the arm 11 adjacent the side of the said arm opposite the arm 18 of the L-shaped duct and with the arm 18 of the L-shaped duct 16 to the exterior of the body, this duct having its extremities counterbored to provide the respective sockets 21 and 29. A small air tube 22 has one end fitting in the socket 21 and extends longitudinally within the mixing tube along one side thereof and has its free end 23 offset and terminating concentrically within the contracted end 25 of the mixing tube. A nipple 30 has a stem 31 screw-threaded into the socket 29 and communicates with the duct 28.

In use, the nipple 6 is connected with a supply of gas by means of a hose or the like, and upon the valve 7 being opened, the gas will pass into the tubular arm 9 and through the duct 16 in the body 10, to emit through the aperture 32 and pass into the mixing tube 24. Air will be drawn through the apertures or inlets 26 which will mingle or mix with the gas, the mixture passing through the outer end of the mixing tube 24 to produce the regular Bunsen flame. The mixing tube 24 being mounted on the arm 11 of the body 10, which body is swiveled on the end of the tubular arm 9, may be swung or rotated in a lateral plane to apply the Bunsen flame to the object to be heated at various angles, as may be desired or necessary. Air may be forced through the tube 22, by connecting the nipple 30 with a bellows, compressed air reservoir, or the like, or by connecting one end of a short piece of hose or tubing (not shown) to the nipple 30 and by placing the other end thereof in the mouth, in which event the operator may cause a blast of air to pass through the said tube. When air is forced through the tube 20, the same is ejected in a thin or fine stream to draw the burning gas into a needle pointed flame, whereby the needle pointed flame may be applied against the object to be heated, for use in fusing, soldering, or for other purposes for which blow pipes are useful. The burner may also be swung upon the arm 9 to and from the object being heated, or may be swung upon the said arm against the wall or support to which the bracket or fixture 5 is secured, thereby swinging the burner out of the way. Flames of various sizes and intensities may be produced by regulating the flow of gas and the pressure of air blast passing through the tube 22.

In the above manner, this device may be used either as a Bunsen burner or as a blow pipe, and may be readily adjusted to apply the flame at various angles with the object to be heated, this device being simple in its construction, as well as convenient and efficient in use.

Having described the invention, what is claimed as new is:

1. In a combination burner and blow pipe, a tubular arm, an L-shaped body having one arm swiveled on the tubular arm, a mixing tube having one end mounted on the other arm of the body and having inlets, the body having an L-shaped duct with its extremities extending to the extremities of the respective arms, and the body having an air duct extending from the extremity of the arm on which the mixing tube is mounted to the exterior of the body, and a small air tube having one end engaged to the arm of the body on which the mixing tube is mounted, the said air tube communicating with the air duct and extending longitudinally within the mixing tube with its free end terminating concentrically within the free end of the mixing tube.

2. In a combination burner and blow pipe, a tubular arm, an L-shaped body having one arm swiveled on the end of the tubular arm, and having the other arm reduced in diameter to form a shoulder, a mixing tube having one end mounted on the reduced arm and abutting against the shoulder, the mixing tube having its free end contracted and having inlets, the body having an L-shaped duct with its extremities extending to the extremities of the arms, the extremity of the said duct in the reduced arm being arranged adjacent the side of the reduced arm and being counterbored to form a socket, an apertured mouthpiece fitting in the socket, and the body having an air duct extending from the extremity of the reduced arm adjacent the side of the reduced arm opposite the aforementioned duct and parallel with the corresponding arm of the L-shaped duct to the exterior of the body, the air duct having its extremities counterbored to provide sockets, a small air tube having one end fitting in one socket of the air duct and extending longitudinally within and along the one side of the mixing tube with its free end offset and terminating concentrically within the contracted end of the mixing tube, and a nipple having a stem screw-threaded into the other socket of the air duct.

3. In a combination burner and blow pipe, a tubular arm, an L-shaped body having one arm swiveled on the tubular arm, a mixing tube having one end mounted on the other arm of the body, the mixing tube having its free end contracted and having inlets, the body having an L-shaped duct with its extremities extending to the extremities of the respective arms, and the body having an air duct extending from the extremity of the arm on which the mixing tube is mounted and parallel with the corresponding arm of the L-shaped duct to the exterior of the body, the air duct having one extremity counter-bored to provide a socket, and a small air tube having one end fitting in the said socket of the air duct and extending longitudinally within the mixing tube with its free end terminating concentrically within the contracted end of the mixing tube.

In testimony that I claim the foregoing as my own, I have hereto affixed my signature in the presence of two witnesses.

ARTHUR H. SCHILKE.

Witnesses:
NINA V. SCHILKE,
ELIAS WILLIAMS.

---

Copies of this patent may be obtained for five cents each, by addressing the "Commissioner of Patents, Washington, D. C."